(12) United States Patent
Wells et al.

(10) Patent No.: US 12,353,741 B2
(45) Date of Patent: Jul. 8, 2025

(54) SUPERBLOCK-BASED WRITE MANAGEMENT IN NON-VOLATILE MEMORY DEVICES

(71) Applicant: Kioxia Corporation, Tokyo (JP)

(72) Inventors: Steven Wells, San Jose, CA (US); Neil Buxton, Berkshire (GB); Nigel Horspool, Abingdon (GB); Mohinder Saluja, Cupertino, CA (US); Paul Suhler, Austin, TX (US)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 18/639,821

(22) Filed: Apr. 18, 2024

(65) Prior Publication Data

US 2024/0264758 A1 Aug. 8, 2024

Related U.S. Application Data

(63) Continuation of application No. 17/690,287, filed on Mar. 9, 2022, now Pat. No. 11,966,605.

(51) Int. Cl.
*G06F 3/06* (2006.01)
*G06F 12/02* (2006.01)

(52) U.S. Cl.
CPC ............ *G06F 3/064* (2013.01); *G06F 3/0604* (2013.01); *G06F 3/0659* (2013.01); *G06F 3/0679* (2013.01); *G06F 12/0246* (2013.01); *G06F 2212/7208* (2013.01)

(58) Field of Classification Search
None
See application file for complete search history.

(56) References Cited

U.S. PATENT DOCUMENTS

| 11,966,605 | B2* | 4/2024 | Wells ................... G06F 3/0679 |
| 2005/0144357 | A1 | 6/2005 | Sinclair |
| 2005/0144367 | A1 | 6/2005 | Sinclair |
| 2018/0046371 | A1 | 2/2018 | Kim et al. |
| 2019/0114255 | A1* | 4/2019 | Jain ......................... G06F 3/068 |
| 2020/0012444 | A1 | 1/2020 | Ko et al. |
| 2020/0125281 | A1 | 4/2020 | Yim et al. |
| 2021/0019074 | A1 | 1/2021 | Akin et al. |
| 2021/0064288 | A1 | 3/2021 | Kanno et al. |
| 2022/0214808 | A1* | 7/2022 | Lin ...................... G06F 12/0246 |
| 2022/0391095 | A1 | 12/2022 | Parker et al. |
| 2023/0229326 | A1 | 7/2023 | Buxton et al. |

FOREIGN PATENT DOCUMENTS

TW 200535854 A 11/2005

OTHER PUBLICATIONS

Martin et al., "Technical Proposal 4146 Flexible Data Placement," NVM Express, Nov. 2022, pp. 1-72.
Office Action with a Search Report issued in a Taiwanese application No. 112108580, dated Sep. 15, 2023.

* cited by examiner

*Primary Examiner* — Nathan Sadler
(74) *Attorney, Agent, or Firm* — Foley & Lardner LLP (57) ABSTRACT

Various implementations described herein relate to systems and methods for managing superblocks, including a non-volatile storage including a superblock and a controller configured to notify a host of a size of the superblock to a host, determine a stream that aligns with the superblock, write data corresponding to the stream to the superblock, and determine that writing the data correspond to the stream has completed.

20 Claims, 4 Drawing Sheets

SUPERBLOCK-BASED WRITE MANAGEMENT IN NON-VOLATILE MEMORY DEVICES

CROSS-REFERENCE TO RELATED PATENT APPLICATIONS

This application is a continuation application of U.S. patent application Ser. No. 17/690,287, filed Mar. 9, 2022, which is incorporated herein by reference in its entirety.

TECHNICAL FIELD

The present disclosure relates generally to non-volatile memory storage devices such as Solid State Drives (SSDs), and in particular, to managing superblock-based write processes in non-volatile memory storage devices.

BACKGROUND

A non-volatile memory storage device such as Solid State Drive (SSD) may include superblock structures each created by arranging physical blocks from different dies (e.g., NAND dies) or different planes of the dies as a single structure to support redundancy and protection against one or more of the constituent blocks failing. Such a superblock is commonly referred to as a Redundant Arrays of Independent Disk (RAID) structure as the constituent blocks share similarities with redundancy techniques (e.g., RAID5 or RAID6). Superblocks may be commonly used for enterprise and datacenter implementations, as well as in multi-tenant environments.

Modern SSDs are typically utilized in a multi-tenant environment in which multiple independent processes, sometimes by entirely separate entities and/or companies (e.g., cloud service providers), are being executed simultaneously using the SSDs. Each process is independently reading, writing, trimming, and overwriting to an SSD. A common implementation of an SSD is to form superblocks out of independent locations on the SSD and write a stream of data to a superblock. The writes to the SSD are aggregated into a superblock, and the Garbage Collection (GC) processes data into either the same or a different write stream. Most modern SSDs have two write streams, one for the host writes (writes in response to host commands/data) and another for the GC writes. In some examples, there is a third write stream for internal processes to store metadata such as GC data.

A challenge in a multi-tenant environment in which multiple write users are timesharing the writes is that the data in the superblock fragments against that of the various users, creating additional GC processes.

SUMMARY

Some arrangements relate to systems, methods, and non-transitory computer-readable media comprising computer-readable instructions for notifying a size of the superblock to a host, determining that a stream aligns with the superblock, writing data corresponding to the stream to the superblock, and determining that writing the data correspond to the stream has completed.

DETAILED DESCRIPTION

Non-volatile storage media in a storage device (e.g., an SSD) can be arranged into superblock structures for providing Error Correction Code (ECC) and redundancy protection (e.g., RAID). As referred to herein, a superblock structure refers to a plurality of blocks grouped together with redundancy protection and ECC among those blocks. The grouping, the redundancy protection, and ECC are implemented by a controller, for example, on its firmware or software. If one block in a superblock fails, then the data stored in the failed block can be recovered using data stored on other blocks of the superblock based on ECC (e.g., RAID).

One approach to address a multi-tenant environment is streams, sometimes referred to as Multi-Stream Write (MSW). In this solution, the host identifies a tenant number as part of the write commands. The SSD then creates independent superblocks for each write stream. The data associated with each tenant is more likely to share common characteristics such as data lifetime, write, overwrite, and trim behavior, compared to independent tenants, thus creating less overall garbage collection and improved Write Amplification (WA). In the streams solution, the drive separates tenant writes to separate superblocks to reduce garbage collection. The garbage collection process remains fully orchestrated by the SSD, and the host is not involved.

Append-Only Streams (AOS) and Zoned Namespaces (ZNS) provides finer grain control of the placement of tenant data and provides hints by the host to the drive as to when garbage collection is acceptable. In both AOS and ZNS, the SSD no longer orchestrates garbage collection, and the host is fully responsible for commanding the garbage collection operations on the drive. The drive only services the garbage collection operations as needed. This additional burden is fully required for the host. Also, depending on the implementation, garbage collection requires sequential-only writes which adds additional host burden. A common requirement in ZNS is a zone size similar to rotating magnetic media, which adds additional SSD burden as this is not the native size of the SSD.

To address the gap between explicit host orchestration available in AOS/ZNS class solutions and the lack of host orchestration in a streams solution, the arrangements disclosed herein allow various degrees of host orchestration based on customer preference and motivation for ideal garbage collection management and reduction in WA. The present disclosure relate to systems, methods, apparatuses, and non-transitory computer-readable media for implementing high-performance Random Write with WA of approximately 1 and nearly no Overprovisioning (OP). In some arrangements, the SSD can communicate to the host the size of a superblock. As referred to herein, the size of a superblock refers to the total capacity of the superblock that can be used to store host data. A stream of data can be aligned with the superblock. The host is therefore aware of the superblock sizes and can select streams to align to superblocks. The present arrangements allow the host to orchestrate, on a continuum, from the entirety of stream alignment to the superblocks or none of it, without any errors to the host regardless.

Figure 1:
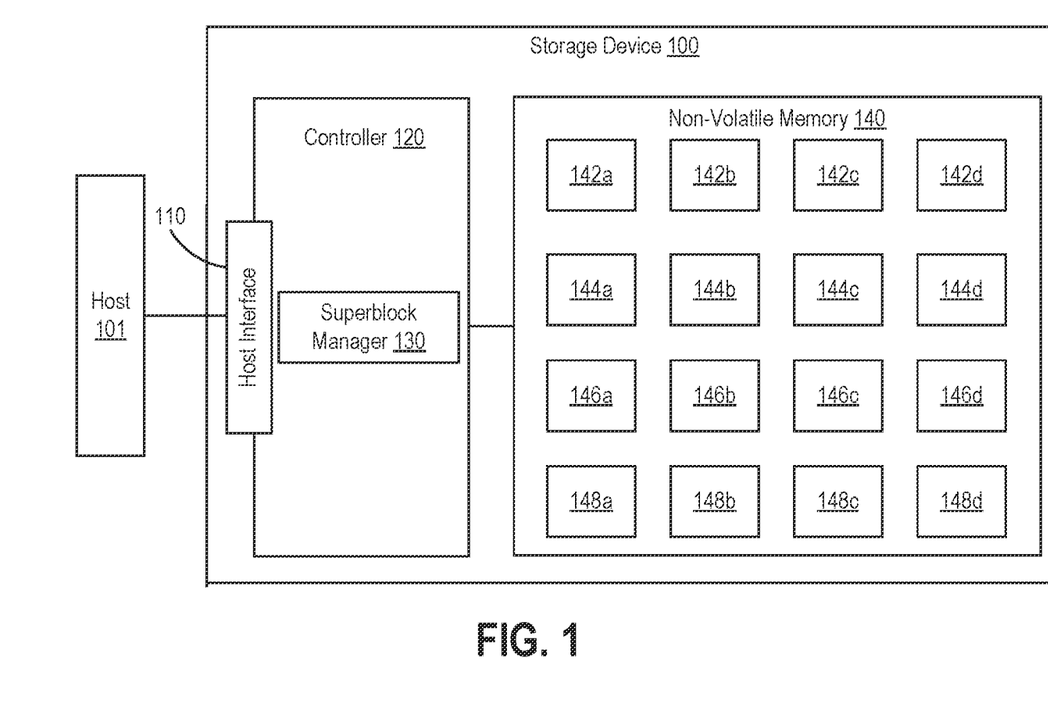
FIG. 1 shows a block diagram of an example storage device, according to some arrangements.

To assist in illustrating the present implementations, FIG. 1 shows a block diagram of a system including a storage device 100 coupled to a host 101 according to some implementations. In some examples, the host 101 can be a user device operated by a user. The host 101 may include an Operating System (OS), which is configured to provide a file system and applications that use the file system. The file system communicates with the storage device 100 (e.g., a controller 120 of the storage device 100) over a suitable wired or wireless communication link or network to manage storage of data in the storage device 100.

In that regard, the file system of the host 101 sends data to and receives data from the storage device 100 using a suitable host interface 110 of the storage device 100. The host interface 110 allows the software (e.g., the file system) of the host 101 to communicate with the storage device 100 (e.g., the controller 120). While the host interface 110 is conceptually shown as a block between the host 101 and the storage device 100, the host interface 110 can include one or more controllers, one or more namespaces, ports, transport mechanisms, and connectivity thereof. To send and receive data, the software or file system of the host 101 communicates with the storage device 100 using a storage data transfer protocol running on the host interface 110. Examples of the protocol include but are not limited to, the Serial Attached Small Computer System Interface (SAS), Serial AT Attachment (SATA), and Non-Volatile Memory Express (NVMe) protocols. The host interface 110 includes hardware (e.g., controllers) implemented on the host 101, the storage device 100 (e.g., the controller 120), or another device operatively coupled to the host 101 and/or the storage device 100 via one or more suitable networks. The host interface 110 and the storage protocol running thereon also includes software and/or firmware executed on the hardware.

In some examples, the storage device 100 is located in a datacenter (not shown for brevity). The datacenter may include one or more platforms, each of which supports one or more storage devices (such as but not limited to, the storage device 100). In some implementations, the storage devices within a platform are connected to a Top of Rack (TOR) switch and can communicate with each other via the TOR switch or another suitable intra-platform communication mechanism. In some implementations, at least one router may facilitate communications among the storage devices in different platforms, racks, or cabinets via a suitable networking fabric. Examples of the storage device 100 include non-volatile devices such as but are not limited to, an SSD, a Non-Volatile Dual In-line Memory Module (NVDIMM), a Universal Flash Storage (UFS), a Secure Digital (SD) device, and so on.

The storage device 100 includes at least a controller 120 and a non-volatile memory 140. Other components of the storage device 100 are not shown for brevity. The non-volatile memory 140 includes NAND flash memory devices. Each of the NAND flash memory devices includes one or more of the NAND flash dies 142a-142d, 144a-144d, 146a-146d, and 148a-148d, which are non-volatile memory capable of retaining data without power. Thus, the NAND flash memory devices refer to multiple NAND flash memory devices or dies within the non-volatile memory 140. The non-volatile memory 140 can therefore be referred to a memory array of dies as shown. Each of the dies 142a-142d, 144a-144d, 146a-146d, and 148a-148d has one or more planes. Each plane has multiple blocks, and each block has multiple pages.

The dies 142a-142d, 144a-144d, 146a-146d, and 148a-148d can be arranged in one or more memory communication channels connected to the controller 120. For example, dies 142a-d can be configured on one memory channel, dies 144a-d on another, and so on. While the 16 dies 142a-142d, 144a-144d, 146a-146d, and 148a-148d are shown in FIG. 1, the non-volatile memory 140 can include any suitable number of non-volatile memory dies that are arranged in one or more channels in communication with the controller 120.

While the dies 142a-142d, 144a-144d, 146a-146d, and 148a-148d are shown as an example implementation of the non-volatile memory 140, other examples of non-volatile memory technologies for implementing the non-volatile memory 140 include but are not limited to, Magnetic Random Access Memory (MRAM), Phase Change Memory (PCM), Ferro-Electric RAM (FeRAM), Resistive RAM (ReRAM), and so on that have locations for forming a superblock. The superblock management mechanisms described herein can be likewise implemented on memory systems using such memory technologies and other suitable memory technologies.

Examples of the controller 120 include but are not limited to, an SSD controller (e.g., a client SSD controller, a datacenter SSD controller, an enterprise SSD controller, and so on), a UFS controller, or an SD controller, and so on.

The controller 120 can combine raw data storage in the dies 142a-142d, 144a-144d, 146a-146d, and 148a-148d such that those dies 142a-142d, 144a-144d, 146a-146d, and 148a-148d function as a single storage. The controller 120 can include processors, microcontrollers, central processing units (CPUs), caches, buffers (e.g., buffers), error correction systems, data encryption systems, Flash Translation Layers (FTLs), mapping tables, a flash interface, and so on. Such functions can be implemented in hardware, software, and firmware or any combination thereof. In some arrangements, the software/firmware of the controller 120 can be stored in the non-volatile memory 140 or in any other suitable computer readable storage medium.

The controller 120 includes suitable processing and memory capabilities for executing functions described herein, among other functions. The controller 120 manages various features for the non-volatile memory 140, including but not limited to, I/O handling, reading, writing/programming, erasing, monitoring, logging, error handling, garbage collection, wear leveling, logical to physical address mapping, data protection (encryption/decryption), and the like. Thus, the controller 120 provides visibility to the dies 142a-142d, 144a-144d, 146a-146d, and 148a-148d.

In some arrangements, the controller 120 includes a superblock manager 130 configured to manage forming and maintaining the superblocks in the manner described herein. For example, the superblock manager 130 can form superblocks from the dies 142a-142d, 144a-144d, 146a-146d, and 148a-148d by selecting or reselecting block locations (e.g., those dies 142a-142d, 144a-144d, 146a-146d, and 148a-148d or planes thereof) that form the superblocks. The superblock manager 130 can be implemented using the processing and memory capabilities of the controller 120. The superblock manager 130 can be firmware or software or hardware running on the controller 120 and stored as codes in one or more suitable non-transitory memory devices. In some examples, the superblock manager 130 stores a list of blocks (e.g., a list of physical addresses of the blocks) for each superblock in a local memory and/or in the non-volatile memory 140.

Figure 2A:
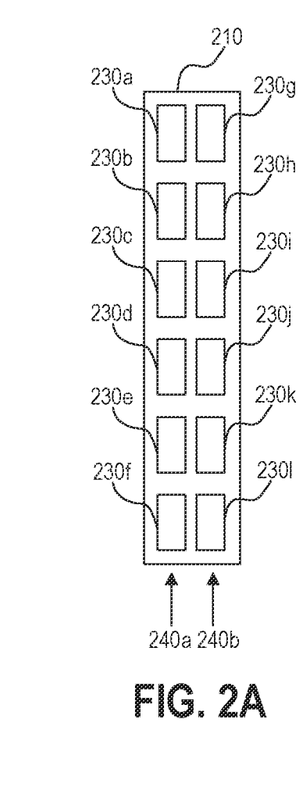
FIG. 2A is a schematic diagram illustrating a die.

FIG. 2A is a schematic diagram illustrating a die 210. Referring to FIGS. 1 and 2A, a non-volatile memory of a storage device, such as the non-volatile memory 140 of the storage device 100, includes dies such as the die 210. The die 210 can be a die such as but not limited to, one of dies 142a-142d, 144a-144d, 146a-146d, and 148a-148d. As shown, the die 210 includes 12 blocks 230a, 230b, 230c, 230d, 230e, 230f, 230g, 230h, 230i, 230j, 230k, and 230l (collectively 230a-230l), each of which is denoted as a rectangle. The 12 blocks 230a-230l are shown for illustrative purposes. It should be understood that a die may have any number of blocks. Blocks arranged along a vertical column are located on the same plane. As shown, the die 210 has two planes 240a and 240b, each plane includes six blocks. The plane 240a includes blocks 230a-230f, and the plane 230b includes blocks 230g-230l.

Figure 2B:
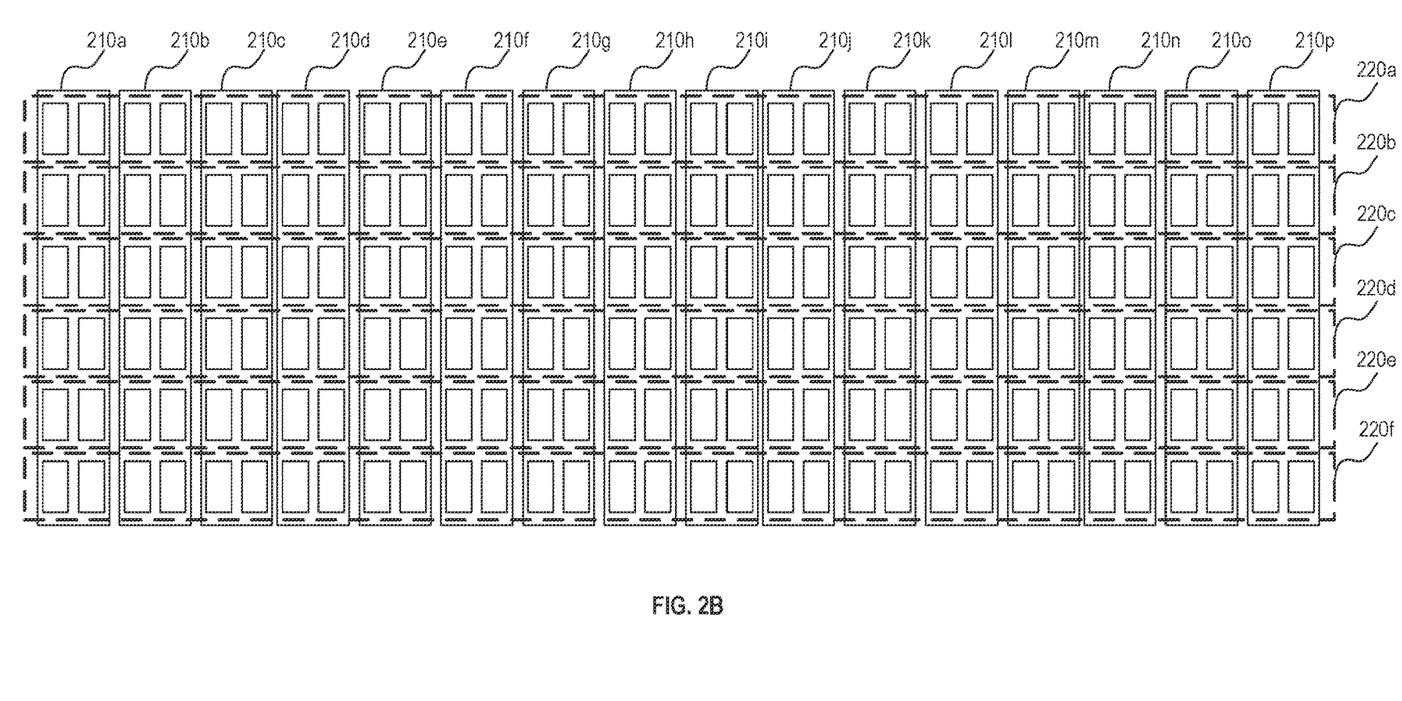
FIG. 2B is a schematic diagram illustrating superblock formation.

FIG. 2B is a schematic diagram illustrating superblock formation. Referring to FIGS. 1, 2A, and 2B, a non-volatile memory of a storage device, such as the non-volatile memory 140 of the storage device 100, includes dies 210a, 210b, 210c, 210d, 210e, 210f, 210g, 210h, 210i, 210j, 210k, 210l, 210m, 210n, 210o, and 210p (collectively 210a-210p). Each of the 16 dies 210a-210p may be a die such as but not limited to, dies 142a-142d, 144a-144d, 146a-146d, and 148a-148d. Each of the dies 210a-210p may be a die such as but not limited to, the die 210.

Each of the dies 210a-210p includes 12 blocks, each of which is denoted as a rectangle and can be a block such as but not limited to, the blocks 230a-230l. The 12 blocks are shown for illustrative purposes. It should be understood that a die may have any number of blocks. Blocks arranged along a vertical column are located on the same plane. As shown, each of the dies 210a-210p has two planes (e.g., the planes 240a and 240b), each plane includes six blocks.

As shown in FIG. 2B, the superblock manager 130 may select a block from each of the planes to form a superblock. Thus, superblocks 220a, 220b, 220c, 220d, 220e, and 220f (collectively 220a-220f) are formed. Each of the superblocks 220a-220f is formed with a block from each plane of the dies 210a-210p. Other arrangements to generate superblocks can be likewise implemented based on superblock size and RAID requirement.

Each of the superblocks 220a-220f may have designated block(s) for RAID protection, referred to as RAID protection block(s). RAID protection data can be encoded using suitable ECC algorithms such as Reed-Solomon (RS) or Parity (XOR) encoding, allowing data in failed blocks to be recovered. In other arrangements, the superblocks 220a-220f may not have any block for RAID protection.

In some arrangements, the host 101 may send a stream of data to the storage device 100 via the host interface 110 to be written to the non-volatile memory 140. Data that belongs to the same stream are tagged with the same stream identifier (ID). A stream can be aligned to the size of one or more superblocks. For example, the storage device 100 can declare to the host 101 the size of one or more superblocks (e.g., superblocks 220a-220f) formed in the non-volatile memory 140. The controller 120 self-orchestrates GC, and the host 101 can provide hints to the storage device 100 to assist the controller 120 with coordinating the GC.

Figure 3:
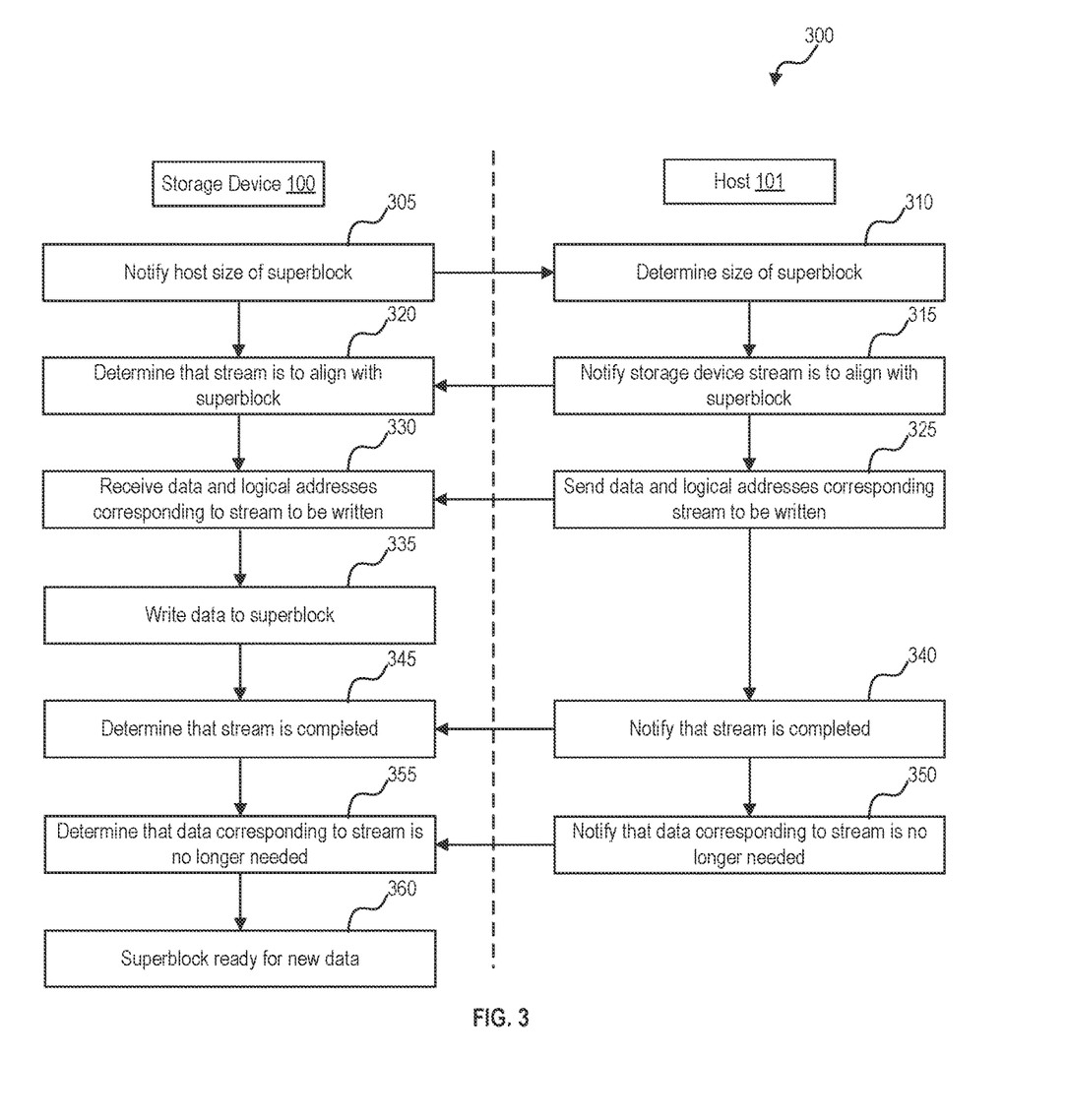
FIG. 3 is a flowchart diagram illustrating a method for writing data corresponding to a stream to a superblock, according to some arrangements.

For example, FIG. 3 is a flowchart diagram illustrating a method 300 for writing data corresponding to a stream to a superblock, according to some arrangements. Referring to FIGS. 1-3, the method 300 can be performed by the storage device 100 (e.g., the controller 120) and the host 101.

At 305, the controller 120 notifies the host 101 the size of a superblock. In some examples, the controller 120 can send a superblock size notification (e.g., a message, a command, an indication, signaling, or so on) to the host 101 that indicates the size (e.g., the total data storage capacity available to store host data) of a superblock. In some examples, the superblock size notification is an identification command used by the controller 120 to indicate the size of a superblock. In some examples, the size of each of multiple superblocks is communicated to the host 101 at 305. The sizes of the multiple superblocks may be the same or may be different. In the examples in which the sizes of the multiple superblocks declared at 305/310 are different, the notification sent by the storage device 100 to the host 101 includes superblock IDs mapped to corresponding sizes. A superblock ID may identify a particular defined superblock or a group/type of superblocks where each superblock in the group/type has the same size.

In some arrangements, in addition to the size of a superblock, the controller 120 also notifies the host 101 via a suitable notification, message, command, indication, or signaling a number of streams that can be simultaneously written to the storage device 100 (e.g., to the non-volatile memory 140). In other words, the host 101 can simultaneously write multiple streams to the superblocks of the storage device 100, where each stream is written to one or more designated superblocks in the manner described herein.

At 310, the host 101 determines the size of the superblock. For example, the host 101 can determine the size of the superblock by receiving the superblock size notification from the controller 120. In some arrangements, the controller 120 notifies the host 101 the size of a superblock at 305 in response to receiving a superblock size interrogation command from the host 101. The superblock size interrogation command requests the storage device 100 to provide the size of at least one superblock to the host 101. In some arrangements, in addition to the size of a superblock, the host 101 also receives the number of streams that can be simultaneously written to the storage device 100 (e.g., to the non-volatile memory 140) via a suitable notification, message, command, indication, or signaling.

At 315, the host 101 notifies the storage device 100 via a suitable notification, message, command, indication, or signaling that a stream of data is to be aligned with a superblock, the size of which is determined at 310. Based on the size of the superblock, the host 101 may select a stream of data having a size that approximately corresponds to the size of the superblock. In some examples, the host 101 selects a stream of data (which may correspond to an application, a file, or a system) having a size that is equal to or less than (but no greater than) the size of a superblock as declared by the storage device 100 at 305. For instance, the host 101 may select a stream of data having a size of 255 MB to align with a superblock having a size of 256 MB available to store host data.

In some examples, the host 101 notifies the storage device 100 via a suitable notification, message, command, indication, or signaling that a stream of data is that a stream of data is to be aligned with multiple superblocks, the size of which is determined at 310. Based on the sizes of the superblocks, the host 101 may select a stream of data having a size that approximately corresponds to the total size of multiple superblocks. In some examples, the host 101 selects a stream of data (which may correspond to an application, a file, or a system) having a size that is equal to and less than (but no greater than) the total size of multiple superblock as declared by the storage device 100 at 305. For instance, the host 101 may select a stream of data having a size of 1019 MB to align with four superblocks having a total size of 1024 MB (each with 256 MBs) available to store host data.

The host 101 can notify the storage device 100 using a stream alignment command that indicates that a stream of data should align with one or more superblocks that are previously empty. In some examples, the stream alignment command includes a stream ID and the indication that data corresponding to such stream ID (e.g., tagged with the stream ID) should be written to the one or more superblocks. In the examples in which the host 101 designates that a stream of data is to be written to multiple superblocks, the stream alignment command can indicate a number of superblocks if the superblocks have the same size, or the stream alignment command can indicate the superblock IDs.

At 320, the controller 120 determines that the stream of data (e.g., a stream ID) is to align with one or multiple superblocks. For example, the controller 120 can determine that the stream of data is to align with one or multiple superblocks by receiving the stream alignment command from the host 101. In response to 320, the controller 120 allocates one or more empty superblocks for the stream according to the stream alignment command. In the examples in which the sizes of the superblocks are the same, the controller 120 allocates the number of empty superblocks as indicated in the stream alignment command for the data stream. In the examples in which the sizes of the superblocks are different, the controller 120 allocates one or more empty superblocks having the superblock IDs contained in the stream alignment command. In response to determining that the number of superblocks or a superblock corresponding to a superblock ID is not empty or stores data, the controller 120 erases at least one superblock (e.g., via garbage collection) to meet the requirements of the stream alignment command. That is, the controller 120 can erase previously stored data in a superblock before writing the data (e.g., received from the host at 330) corresponding to the stream to the superblock.

At 325, the host 101 sends the data of the stream and logical addresses corresponding to the stream to the storage device 100. Examples of the logical addresses include a range of Logical Block Addresses (LBAs). The data are tagged with the stream ID identifying the stream. At 330, the controller 120 receives the data of the stream and logical addresses corresponding to the stream to be written to the non-volatile memory 140.

At 335, the controller 120 writes the data to at least one superblock allocated for the stream. In some arrangements, the FTL of the controller 120 translates the local addresses into physical addresses of the allocated superblock(s), and programs the data to the physical addresses. In some arrangements, data corresponding to the logical addresses of the stream can be written to the allocated superblock(s), overwritten by additional data corresponding to the logical addresses of the stream, or written in a sequential or random order to the allocated superblock(s), with the expectation that the host 101 writes data having a size that does not exceed the total size of the superblocks notified at 315 and allocated by the controller 120.

The host 101 has the capability to and the choice of completely aligning a data stream to one or more superblocks (e.g., 100% alignment) or not aligning the data stream to any superblock (e.g., 0% alignment), or anything in between. In other words, the behavior of the host 101 in response to receiving the size(s) of the superblock(s) lies on a continuum between 100% stream alignment and 0% stream alignment. In a multi-tenant environment, some tenants may be configured to implement superblock alignment features while others may not. Allowing the host behaviors to lie on the continuum enables adoption/migration over time. In some examples in which the host 101 sends data having a size that exceeds the total size of the superblock(s) notified at 315 and allocated by the controller 120, the controller 120 allocates at least one additional superblock for the overflow data without generating any error notifications to the host 101 to allow flexible host implementation.

In some arrangements, in response to determining the size of the superblock at 310, the host 101 may send data and logical addresses corresponding to the stream to be written without notifying the storage device 100 that the stream is to align with the superblock 315. The storage device 100 (e.g., the controller 120) can write the data stream to at least one superblock as conventionally done.

In some arrangements, in response to determining the size of the superblock at 310, the host 101 may notify the storage device 100 (via suitable notification, message, command, indication, or signaling) that a stream is to align with one or more superblocks. The storage device 100 (e.g., the controller 120) can write the data stream identified by the host 101 to align with the one or more superblocks to those superblocks, as described with reference to FIG. 3.

At 340, the host 101 notifies that the stream is completed via a suitable notification, message, command, indication, or signaling. The stream being completed means that no further writes to the stream are needed. For example, the host 101 sends a stream completion command to the controller 120, where the stream completion command includes the stream ID and an indication that the host 101 will send no further data corresponding to the stream ID.

At 345, the controller 120 determines that the stream is completed. For example, the controller 120 determines that the stream is completed by receiving the stream completion command. In response to determining that the stream is completed, the controller 120 can write redundancy protection information (e.g., the XOR/RAID stripe information) to the non-volatile memory 140 (e.g., to the at least one allocated superblock) and free up resources (e.g., write buffers) of the storage device 100 for writing data corresponding to another stream, which may begin at block 320.

At some point, the host 101 may determine that the data corresponding to the stream written at 335 is no longer useful. At 350, the host 101 notifies the controller 120 that the data corresponding to the stream is no longer needed via a suitable notification, message, command, indication, or signaling. For example, the host 101 sends a stream termination command to the controller 120 including the stream ID and an indication that the data corresponding to the stream ID is no longer needed. Alternatively, the host 101 sends a deallocation command or trim command to the controller 120 identifying the logical addresses (e.g., those sent at 325).

At 355, the controller 120 determines that the data corresponding to the stream is no longer needed. For example, the controller 120 determines that the data corresponding to the stream is no longer needed by receiving the stream termination command or the deallocation/trim command. In response, at 360, the at least one superblock is ready for new data, and the controller 120 declares that the entirety of the at least one superblock to be invalid. The controller 120 can program new data in the at least one superblock without performing garbage collection, without moving any valid data from the superblock to another location. By declaring data in entire superblock(s) to be invalid, garbage collection for the superblock(s) is not needed. Thus, the WA is 1.

Figure 4:
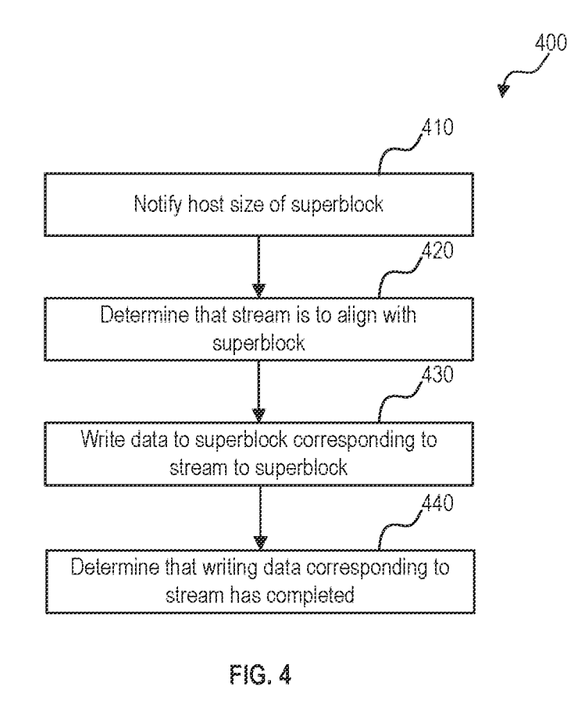
FIG. 4 is a flowchart diagram illustrating a method for writing data corresponding to a stream to a superblock, according to some arrangements.

FIG. 4 is a flowchart diagram illustrating a method 400 for writing data corresponding to a stream to a superblock, according to some arrangements. Referring to FIGS. 1-4, the method 400 can be performed by the storage device 100 (e.g., the controller 120). One or more of 305-360 corresponds to each of 410-440 in the method 400.

At 410, the controller 120 notifies a size of a superblock to the host 101. In some arrangements, notifying the size of the superblock includes sending a superblock size notification to the host 101. The superblock size command indicates the size of the superblock.

At 420, the controller 120 determines that a stream aligns with the superblock. In some arrangements, determining that the stream aligns with the superblock includes receiving a stream alignment command from the host 101. The stream alignment command indicates that the stream aligns with the superblock. Indicating that the stream aligns with the superblock corresponds to indicating that the size of the stream is less than or equal to the size of the superblock.

At 430, the controller 120 writes data corresponding to the stream to the superblock. In some arrangements, writing the data corresponding to the stream to the superblock includes writing the data corresponding to the stream to the superblock which is previously empty. In some arrangements, the controller 120 erases previously stored data in the superblock before writing the data corresponding to the stream to the superblock. In some arrangements, the controller 120 receives the data corresponding to the stream from host 101. The data corresponding to the stream is written to the superblock in response to receiving the data from the host 101.

At 440, the controller 120 determines that writing the data correspond to the stream has completed. In some arrangements, determining that writing the data corresponding to the stream has completed includes receiving a stream completion command from the host 101, wherein the stream completion command indicates that writing the data correspond to the stream has completed.

In some arrangements, the controller 120 receives from the host 101 a stream termination command that the data corresponding to the stream is invalid.

In some arrangements, notifying the size of the superblock to the host 101 includes notifying a size for each of a plurality of superblocks to the host 101. In some arrangements, determining that the stream aligns with the superblock includes determining that the stream aligns with the plurality of superblocks. In some arrangements, writing the data corresponding to the stream to the superblock includes writing the data to the plurality of superblocks.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storages, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A method, comprising:
    preparing a plurality of superblocks in a non-volatile storage, the plurality of superblocks having a plurality of respective sizes;
    notifying a host of the respective sizes of the plurality of superblocks; and
    writing a stream of data from the host to one of the plurality of superblocks in response to a notification from the host that the stream aligns with the one superblock.

2. The method of claim 1, wherein the non-volatile storage comprises a plurality of dies each comprising a plurality of blocks, wherein preparing includes configuring each of the plurality of superblocks to comprise one or more of the blocks from each of the plurality of dies.

3. The method of claim 1, wherein the non-volatile storage comprises a plurality of planes each comprising a plurality of blocks, and wherein preparing includes configuring each of the plurality of superblocks to comprise one or more of the blocks from each of the plurality of planes.

4. The method of claim 1, further comprising performing garbage collection on the non-volatile storage independently of the host.

5. The method of claim 1, further comprising determining that writing the data corresponding to the stream has completed.

6. The method of claim 1, wherein preparing includes grouping a plurality of blocks comprising each of the superblocks together with respective redundancy protection and ECC among the blocks in the each superblock.

7. The method of claim 1, wherein the notification from the host that the stream aligns with the one superblock includes the host communicating to the controller an identification of the stream and a designation of the one superblock to which data corresponding to the stream having the identification is to be written.

8. The method of claim 1, wherein notifying the host of the respective sizes of the plurality of superblocks comprises sending a superblock size notification to the host for one of the plurality of superblocks, wherein the superblock size notification indicates the respective size of the one superblock.

9. The method of claim 1, wherein the notification from the host that the stream aligns with the one superblock comprises receiving a stream alignment command from the host, wherein the stream alignment command indicates that the stream aligns with the one superblock.

10. A storage device, comprising:
    a non-volatile storage comprising a plurality of superblocks, the plurality of superblocks having a plurality of respective sizes;
    a controller configured to:
        notify a host of the respective sizes of the plurality of superblocks; and
        write a stream of data from the host to one of the plurality of superblocks in response to a notification from the host that the stream aligns with the one superblock.

11. The storage device of claim 10, wherein the non-volatile storage comprises a plurality of dies each comprising a plurality of blocks, and wherein the controller configures each of the plurality of superblocks to comprise one or more of the blocks from each of the plurality of dies.

12. The storage device of claim 10, wherein the non-volatile storage comprises a plurality of planes each comprising a plurality of blocks, and wherein the controller configures each of the plurality of superblocks to comprise one or more of the blocks from each of the plurality of planes.

13. The storage device of claim 10, wherein the controller is further configured to perform garbage collection on the non-volatile storage independently of the host.

14. The storage device of claim 10, wherein the controller is further configured to determine that writing the data corresponding to the stream has completed.

15. The storage device of claim 10, comprising:
    wherein the controller is further configured to group a plurality of blocks comprising each of the superblocks together with respective redundancy protection and ECC among the blocks in the each superblock.

16. The storage device of claim 10, wherein the notification from the host that the stream aligns with the one superblock includes the host communicating to the controller an identification of the stream and a designation of the one superblock to which data corresponding to the stream having the identification is to be written.

17. The storage device of claim 10, wherein notifying the host of the respective sizes of the plurality of superblocks comprises sending a superblock size notification to the host for one of the plurality of superblocks, wherein the superblock size notification indicates the respective size of the one superblock.

18. The storage device of claim 10, wherein the notification from the host that the stream aligns with the one superblock comprises receiving a stream alignment command from the host, wherein the stream alignment command indicates that the stream aligns with the one superblock.

19. The storage device of claim 18, wherein indicating that the stream aligns with the one superblock corresponds to indicating that a size of the stream is less than or equal to the respective size of the one superblock.

20. The storage device of claim 10, wherein before writing the data to the one superblock and in response to the notification from the host, the controller is configured to erase previously stored data in the one superblock.

* * * * *